US011079602B2

(12) United States Patent
Zozgornik

(10) Patent No.: US 11,079,602 B2
(45) Date of Patent: Aug. 3, 2021

(54) OPTICAL ELEMENT FOR LIGHTING DEVICE

(71) Applicant: Lumileds LLC, San Jose, CA (US)

(72) Inventor: Steffen Zozgornik, Leverkusen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/590,206

(22) Filed: Oct. 1, 2019

(65) Prior Publication Data
US 2020/0103666 A1 Apr. 2, 2020

(30) Foreign Application Priority Data
Oct. 2, 2018 (EP) ..................................... 18198285

(51) Int. Cl.
*G02B 27/09* (2006.01)
*F21S 41/24* (2018.01)
(Continued)

(52) U.S. Cl.
CPC .......... *G02B 27/0927* (2013.01); *F21S 41/24* (2018.01); *F21S 41/322* (2018.01);
(Continued)

(58) Field of Classification Search
CPC .... F21S 41/151–16; F21S 41/24; F21S 41/25; F21S 41/285; F21S 41/30–323; G02B 27/09–0927; G02B 27/30
(Continued)

(56) References Cited

U.S. PATENT DOCUMENTS 7,670,038 B2    3/2010  Schug et al.
7,810,975 B2 *  10/2010 Specht .................. F21S 41/151
                                                          362/555
(Continued)

FOREIGN PATENT DOCUMENTS

DE    10302969 A1    8/2004
EP     2743567 A1    6/2014

OTHER PUBLICATIONS

Extended European Search Report dated Apr. 16, 2019, European Patent Application No. 18198285.1, 8 pages.
(Continued)

*Primary Examiner* — Jason M Han

(57) ABSTRACT

The disclosure relates to an optical element for a lighting device, the optical element comprising a body capable of conducting light, wherein the body comprises: a light incoupling surface; a light outcoupling surface; and side faces situated opposite to each other and extending from the light incoupling surface to the light outcoupling surface; wherein at least one of the side faces has an aspherical shape at least in sections. The at least one side face having the aspherical shape is capable of focussing light originating from a first point on the light incoupling surface to a second point on the light outcoupling surface by internal reflection at least in the sections. The optical element may serve in the lighting device as a precollimator with configurable intensity distribution of the precollimated light. The shape of the optical element may be easily determined for various dimensions of the optical element. The disclosure further relates to a lighting device and a method for production of a lighting device.

13 Claims, 4 Drawing Sheets

(51) Int. Cl.
*F21S 41/32* (2018.01)
*G02B 27/30* (2006.01)
*F21Y 115/10* (2016.01)
*F21S 41/151* (2018.01)

(52) U.S. Cl.
CPC ............. *G02B 27/30* (2013.01); *F21S 41/151* (2018.01); *F21Y 2115/10* (2016.08)

(58) Field of Classification Search
USPC ......... 362/326–340, 511, 516–522, 551–555
See application file for complete search history.

(56) References Cited

U.S. PATENT DOCUMENTS

| | | |
|---|---|---|
| 2003/0214815 A1 | 11/2003 | Ishida et al. |
| 2007/0211487 A1 | 9/2007 | Sormani |
| 2008/0080207 A1 | 4/2008 | Specht et al. |
| 2010/0226142 A1 | 9/2010 | Brendle et al. |
| 2015/0131324 A1 | 5/2015 | Lamberterie |

OTHER PUBLICATIONS

From the EPO as the ISA, Notification of Transmittal of the International SEarch Report and the Written Opinion of the ISA, corresponding to PCT/EP[2019/075675, dated Jan. 7, 2020, 17 pages.

\* cited by examiner

OPTICAL ELEMENT FOR LIGHTING DEVICE

CROSS REFERENCE TO RELATED APPLICATIONS

This application claims priority to European Patent Application No. 18198285.1 filed on Oct. 2, 2018 titled "OPTICAL ELEMENT FOR LIGHTING DEVICE." European Patent Application No. 18198285.1 is incorporated herein by reference.

FIELD OF THE INVENTION

The present disclosure relates to optical elements for use in lighting devices, in particular as precollimators in lighting devices comprising light-emitting elements such as light-emitting diodes (LEDs).

BACKGROUND OF THE INVENTION

Lighting devices may comprise collimators configured to shape a beam of light for illumination from the light emitted by a light source. For example, a beam of substantially parallel light with specific dimensions may be obtained from the light emitted by a light source by means of a collimator. Collimators may for instance comprise reflective elements and/or refractive and/or diffractive elements, e.g. reflective cups and/or lenses.

For applications such as automotive headlights, it may be desirable obtaining not only a certain beam shape but also a certain light intensity distribution in the beam provided by the lighting device. For example, in low-beam headlights a high intensity near the edge of a beam may be advantageous to improve illumination and visibility in the distance while reducing the risk of glare. For other applications, it may be desirable to obtain higher intensities near the center of a light beam.

Collimators may be used in conjunction with further optical elements to tailor the shape of the beam and the intensity distribution within the beam. In particular, lighting devices relying on light-emitting elements such as LEDs may comprise light conducting elements to conduct the light emitted from the light-emitting element to the collimator.

Such light conducting elements may be configured to provide a precollimation of light and in particular to obtain a specific intensity distribution of light acting on the collimator.

US 2007/0211487 A1 discloses an LED lighting device comprising a collimator emitting light through a collimator opening towards a reflector, which has a semiparabolic concave reflective surface.

EP 2 743 567 A1 relates to a primary optical element comprising a plurality of light guides connected in output to a correcting part having an output face at least partly in form of a substantially spherical dome.

U.S. Pat. No. 7,670,038 B2 discloses an LED collimator element that is designed to be asymmetrical at least with respect to a sectional plane, so that a defined non-uniform intensity distribution is achieved in an emission plane.

SUMMARY OF THE INVENTION

Providing suitable optical elements as precollimators may require determining a complex shape of the optical element. As lighting devices such as automotive headlights may comprise an arrangement of multiple light-emitting elements and various shapes of collimators, determining a suitable shape for each optical element may be intricate. Variations in lighting device and collimator design require effective means to determine an efficient shape of the optical element used as precollimator.

It is an object of the present invention to provide an optical element in particular suitable as precollimator in a lighting device wherein the intensity distribution of the precollimated light is configurable and wherein the shape of the optical element may be easily determined for various dimensions of the optical element. The invention further relates to a lighting device with an improved light intensity distribution as well as to a method for producing a lighting device.

According to a first aspect of the present invention, an optical element for a lighting device is provided, the optical element comprising a body capable of conducting light, wherein the body comprises: a light incoupling surface; a light outcoupling surface; and side faces opposite to each other and extending from the light incoupling surface to the light outcoupling surface; wherein at least one of the side faces has an aspherical shape at least in sections, wherein the at least one side face having the aspherical shape is capable of focussing light originating from a first point on the light incoupling surface to a second point on the light outcoupling surface by internal reflection at least in the sections.

According to a second aspect of the present invention, a lighting device is provided comprising at least one light-emitting element and at least one optical element according to the first aspect, wherein the at least one light-emitting element is coupled to the light incoupling surface of the at least one optical element.

According to a third aspect of the present invention, a method for production of the lighting device according to the second aspect is provided, the method comprising: providing the at least one light-emitting element; providing the at least one optical element according to the first aspect; and coupling the at least one light-emitting element to the light incoupling surface of the at least one optical element.

Exemplary embodiments of the first, second, and third aspect of the invention may have one or more of the properties described below.

The body capable of conducting light in particular comprises or consists of transparent material. For instance, the body may be an integral element. The light incoupling surface, the light outcoupling surface, and the side faces may be formed by the surfaces of the body.

The light incoupling surface may be connectable to a light-emitting element directly or indirectly, in that light emitted by the light emitting element may enter the body at the light incoupling surface. In particular, the shape of the light incoupling surface may conform to the shape of a light-emitting face of the light-emitting element. In particular, the light incoupling surface may have a planar and/or rectangular shape.

The light outcoupling surface is capable of providing an outcoupling of light being coupled into the body at the light incoupling surface. The light outcoupling surface may in particular have a planar and/or rectangular shape. In some embodiments, the light outcoupling surface may conform to the shape of another optical element following an inventive optical element such as a collimator, and the outcoupling surface may also be curved. For instance, the light incoupling surface may be arranged at a first end of the body and the light outcoupling surface may be arranged at a second end of the body opposite the first end. A longitudinal or length direction of the body, and in particular the longest dimension of the body, may extend from the light incoupling surface to the light outcoupling surface. In particular, the light incoupling surface and the light outcoupling surface may substantially be parallel to each other, being for instance flat surfaces that are substantially parallel to each other, i.e. parallel within an accuracy of +/−10°, in particular within +/−5°. In other embodiments, the light incoupling surface may be tilted at a specific angle with respect to the light outcoupling surface.

In some embodiments, the light incoupling surface is smaller than the light outcoupling surface and the body has a cross sectional area that is increasing with increasing distance from the light incoupling surface to the light outcoupling surface in sections or along the whole body. The optical element then may provide an expansion of the illuminated area from the light incoupling surface to the light outcoupling surface.

At least one of the side faces extending from the light incoupling surface to the light outcoupling surface has an aspherical shape at least in sections. The aspherical shape is arranged to provide internal reflection at least for part of the light entering the body at the light incoupling surface. In particular, with an increase in cross sectional area along the body, the optical element may provide (pre-)collimation of light passing from the light incoupling surface to the light outcoupling surface.

As the at least one side face having the aspherical shape is capable of focussing light originating from a first point on the light incoupling surface to a second point on the light outcoupling surface by internal reflection at least in the sections, the intensity distribution of the light being coupled out from the light outcoupling surface can be controlled in a straightforward manner. In particular, when a light-emitting element is coupled to the light incoupling surface emitting a given intensity at the first point, the second point may be chosen specifically to optimize the illumination provided by the optical element. In particular, the second point may correspond to a point on the light outcoupling surface that is intended to provide a high intensity compared to the remaining area of the light outcoupling surface.

The aspherical shape is capable of focussing light originating from the first point on the light incoupling surface to the second point on the light outcoupling surface and may therefore be determined in a simple manner, e.g. the aspherical shape may be derived from optical principles or modelled numerically for a variety of dimensions of the body. The optical element according to the present invention may therefore be particularly useful for lighting devices comprising multiple further optical elements with different dimensions, wherein a well-defined intensity distribution of the outcoupled light is required.

The first "point" and/or the second "point" may have a small lateral dimension as compared to the sizes of the light incoupling surface and the light outcoupling surface. For instance, the dimensions of the first and/or second point may be determined by a spatial accuracy of focussing of light as provided by the aspherical shape of the side face with the aspherical shape as given by manufacturing accuracy and material properties. The focussing of light is provided by internal reflection at the side face, optionally supported by other means, e.g. a reflective coating on the side face to improve reflectivity, for instance to improve reflectivity in view of surface roughness.

In some embodiments, the refractive index n of the material of the body is from 1.3 to 2.0, in particular from 1.4 to 1.6 and in particular 1.42. For instance, the body may comprise or consist of (transparent) silicone.

According to an exemplary embodiment of the invention, the at least one side face having the aspherical shape is capable of focussing light originating from a line of first points on the light incoupling surface to a line of second points on the light outcoupling surface by internal reflection at least in the sections. That is, a focussing from a first to a second point may not only be provided within a single plane of the body, but within multiple planes and preferably within at least a section of the body. Hence, not only a single second point may be provided with e.g. higher intensity but a line of second points. In particular, the line of first points and/or the line of second points may form a straight line on the light incoupling and/or outcoupling surface. In some embodiments, the line of first points and/or second points may extend from one edge to an opposite edge of the light incoupling surface and/or the light outcoupling surface, respectively, wherein in particular the aspherical shape extends along a whole width of a side face.

According to another exemplary embodiment of the invention, the second point or the line of second points is located near an edge of the outcoupling surface. In such a configuration, the optical element may provide an intensity maximum near the edge or "cut-off" of the light outcoupling surface. Such embodiments may provide a useful (pre-) collimation of light for applications such as low-beam headlights. Under "near the edge," it may be understood that the distance of the second point or the line of second points to the edge of the light outcoupling surface is small relative to the size of the light outcoupling surface. For instance, the distance to the edge may be less than 10%, in particular less than 5% of the dimension of the light outcoupling surface. By locating the second point or line of second points near the edge instead of directly at the edge, a loss in intensity and/or focus due to light being directed beyond the edge may be avoided.

The first point or the line of first points may be chosen according to the emission characteristics of the light-emitting element to be coupled to the light incoupling device. According to another exemplary embodiment of the invention, the first point or the line of first points is located near the edge of the incoupling surface. Under "near the edge," it may be understood that the distance of the first point or the line of first points to the edge of the light incoupling surface is small relative to the size of the light incoupling surface. For instance, the distance to the edge may be less than 10%, in particular less than 5% of the dimension of the light incoupling surface.

The dimensions of the body may be chosen according to the intended application, and in particular a distance of the light incoupling surface to the light outcoupling surface, or longitudinal or length dimension of the body, may be chosen in a range of 5 mm to 50 mm, and in particular in a range of 10 mm to 30 mm.

According to another exemplary embodiment of the invention, the other side face opposite the at least one side face having the aspherical shape has a planar shape at least in sections. With a planar shape of the side face opposite to the side face with the aspherical shape, an asymmetric configuration of the optical element may be obtained, wherein in particular the planar shape may contribute to provide an asymmetric light intensity distribution such as an intensity maximum near the edge or "cut-off" of the light outcoupling surface.

In particular, the planar shape may connect to the light incoupling surface such that a substantial amount of light coupled into the optical element at the light incoupling surface may be (internally) reflected at the side face having the planar shape. In some embodiments, the planar shape may be arranged substantially perpendicular to the light incoupling surface. Under "substantially perpendicular" angles of 90°+/−10°, in particular of 90°+/−5°, may be understood. In some embodiments, the planar shape may be arranged with an angle to the light incoupling surface of at least 90°, in particular from 90° to 100° or from 90° to 95°. With an angle of at least 90°, the conduction of light entering the body near the edge of the incoupling surface to the surface with the planar shape may be improved.

According to another exemplary embodiment of the invention, the light incoupling surface and the surface with the planar shape are arranged to provide a virtual light source when a light-emitting element is coupled to the light incoupling surface. The virtual light source may be formed, on the one part, from the light-emitting element itself, i.e., by the light not redirected by the body, and, on the other part, by the reflection of the light of the light-emitting element at the planar surface. For instance, the planar shape may connect to the light incoupling surface and/or may be arranged substantially perpendicular to the light incoupling surface. For instance, the light incoupling surface and its reflection on the planar shape may form a continuous area that appears illuminated, thus acting as a virtual light source when a light emitting element is coupled to the light incoupling surface.

In addition, the first point may correspond to a center of the virtual light source or the line of first points may correspond to a center line of the virtual light source. In case the light incoupling surface and its reflection on the planar shape form a continuous area that appears illuminated, acting as a virtual light source, the center or center line of the virtual light source may be located near or at the edge of the light incoupling surface. In particular, the center (line) of the virtual light source may be focussed on a second point or line of second points located near the edge of the light outcoupling surface. With this, an improved intensity distribution with a cut-off near the edge of the light outcoupling surface may be obtained, wherein both the light incoupling surface and its reflection at the planar shape contribute to the shaping of the intensity distribution.

According to an alternative exemplary embodiment of the invention, the second point or the line of second points is located at a center or a center line of the light outcoupling surface. In particular, the light intensity distribution may be substantially symmetric with respect to the center line of the light outcoupling surface. In particular, the first point is located at the center of the light incoupling surface or the first line of points is located at the center line of the light incoupling surface.

According to another exemplary embodiment of the invention, the side face situated opposite the side face with the aspherical shape also has an aspherical shape at least in sections. With this, both aspherical shapes may contribute to the focussing of the first point to the second point or the first line of points to the second line of points. In particular, both aspherical shapes may be configured such that each of the corresponding side faces is capable of focussing light originating from the first point on the light incoupling surface to the second point on the light outcoupling surface by internal reflection at least in the sections. In particular, the aspherical shapes of the two side faces can be substantially symmetric to each other with respect to a reference axis of the body. The reference axis may be an axis that intersects both the first point and the second point or corresponding first and second points of the lines of first and second points.

According to another exemplary embodiment of the invention, the section of the at least one side face having the aspherical shape extends over substantially half of a distance between the light incoupling surface and the light outcoupling surface, wherein in particular the aspherical shape connects to the light incoupling surface. When the aspherical shape extends over substantially half of such distance (e.g. over half of a length of the body in some embodiments), the area of the side face focussing light from the first point to the second point is optimized.

According to another exemplary embodiment of the invention, the aspherical shape corresponds to a conic aspherical shape with a radius R and a conic constant K. A conic aspherical shape may in particular follow the equation $$y(x)=x^2/[R*(1+\mathrm{Sqrt}(1-(1+K)*x^2/R^2))],$$

with x and y being coordinates relative to a reference point of the body. The conic aspherical shape may further be described by additional even and/or odd polynomic correction terms. In a preferred embodiment, however, no polynomic correction terms occur and the aspherical shape follows the aforementioned equation, yielding a particularly simple form of a conic aspherical shape that may be determined in a straightforward manner.

Further, in some embodiments the radius R and the conic constant K may follow the equations $$R=l^2/h+h \text{ and}$$

$$K=l^2/h^2;$$

wherein l represents a length of the conical aspherical shape and wherein h represents a maximum distance of the conical aspherical shape to a reference axis of the body. In this embodiment, the aspherical shape may be determined in a simple manner for a variety of dimensions l and h, and wherein the aspherical shape may provide a focussing of light originating from the first point on the light incoupling surface to the second point on the light outcoupling surface by internal reflection.

In an exemplary embodiment according to the invention, the lighting device according to the second aspect may further comprise a collimator, wherein the at least one optical element is arranged as a precollimator for the collimator. In particular, the light outcoupling surface of the optical element is coupled to the collimator. The collimator may for instance comprise at least one reflective element and/or at least one refractive or diffractive element configured for a collimation of the light originating from the light outcoupling surface of the inventive optical element.

In some embodiments, the lighting device may comprise multiple optical elements according to the first aspect of the invention, each optical element corresponding and being coupled to a light-emitting element. In particular, at least one light-emitting element may comprise at least one LED. LEDs may comprise at least one semiconductor element such as a p-n-junction, a diode, and/or a transistor. For instance, the LEDs may be provided in form of separate or combined LED dies and/or LED packages, wherein in particular at least one LED may be arranged on a substrate, e.g. on a sapphire substrate. An LED package may comprise a wavelength conversion element (e.g. based on a phosphor) and/or may comprise at least one optical element such as a diffusing layer, a refractive and/or diffractive element (e.g. a lens) and/or a reflective element (e.g. a reflector cup).

In another exemplary embodiment according to the invention, the lighting device is configured for automotive lighting, in particular as automotive headlight. Further, a use of the optical element according to the first aspect as precollimator in automotive lighting, in particular in automotive headlights, is disclosed. As already noted above, embodiments of the optical element are particularly useful to provide an intensity distribution at the light outcoupling surface with high intensities at the second point or the line of second points, such that the illumination of the lighting device may be controlled in a simple manner. In particular, embodiments of the optical element providing a "cut-off" of intensity near the edge of the light outcoupling surface may be advantageous for the use in low-beam headlights.

The features and example embodiments of the invention described above may equally pertain to the different aspects according to the present invention. In particular, with the disclosure of features relating to the optical element according to the first aspect, also corresponding features relating to the lighting device and the method according to the second and third aspect are disclosed.

It is to be understood that the presentation of embodiments of the invention in this region is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

Examples of the invention will now be described in detail with reference to the accompanying drawing, in which.

DETAILED DESCRIPTION OF THE EMBODIMENTS

Figure 1:
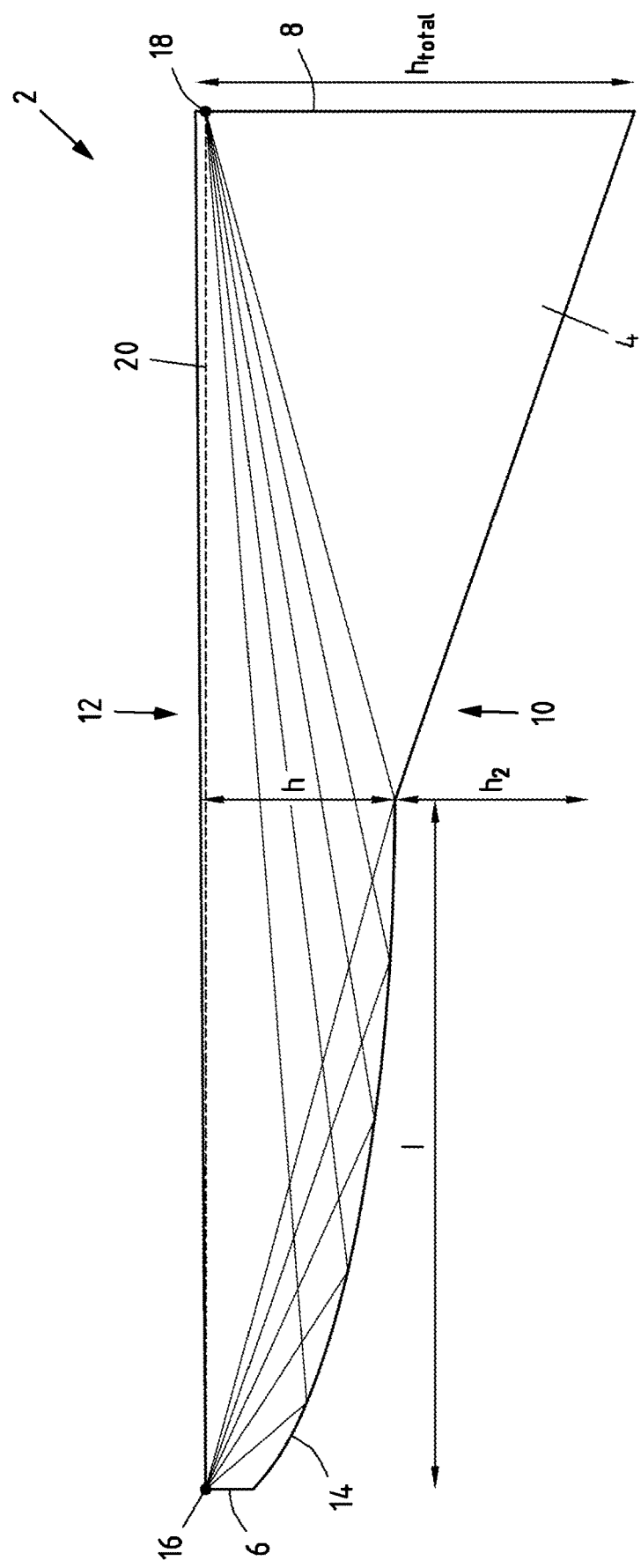
FIG. 1 shows a schematic representation of a first embodiment of an optical element for a lighting device in a cross-sectional view.

FIG. 1 shows a schematic representation of a first embodiment of an optical element 2 for a lighting device in a cross-sectional view. The optical element 2 comprises a body 4 capable of conducting light, for instance a body 4 made of transparent silicone.

The body 4 comprises a light incoupling surface 6 at a first end of the body 4 for coupling to a light-emitting element. The body 4 further comprises a light outcoupling surface 8 at a second end of the body 4 opposite the first end, as well as side faces 10, 12 extending from the light incoupling surface 6 to the light outcoupling surface 8. When a light-emitting element is coupled to the light incoupling surface 6, the optical element 2 may act as (pre-)collimator in that light is conducted and internally reflected by the body 4, while the light may exit from the body at the light outcoupling surface 8 with a specific shape and intensity distribution.

The side face 10 has an aspherical shape 14 in the section shown in the figure. The side face 10 having the aspherical shape 14 is capable of focussing light originating from a first point 16 on the light incoupling surface 6 to a second point 18 on the light outcoupling surface 8 by internal reflection. The second point 18 is located near an edge of the outcoupling surface 8. The first point 16 is located near an edge of the incoupling surface 6. Several light paths comprising internal reflections at the side face 10 from the first point 16 to the second point 18 are indicated by lines in FIG. 1.

The aspherical shape 14 of the side face 10 has a length l and extends over substantially half of a distance between the light incoupling surface 6 and the light outcoupling surface 8. The aspherical shape 14 of side face 10 connects to the light incoupling surface 6 to optimize the amount of light that is focused on the second point 18. The remaining part of the side face 10 has a planar shape that is angled such that a part of the body 4 has a trapezoid shape, wherein the conduction of light to the light outcoupling surface 8 is improved.

The side face 12 situated opposite the side face 10 having the aspherical shape 14 has a planar shape and connects to the light incoupling surface 6 at the edge near the first point 16. The side face 12 is substantially perpendicular to the light incoupling surface 6 including an angle in-between being slightly larger than a right angle and being within a range of 90° to 100°.

With the arrangement of the side face 12 having a planar shape and the light incoupling surface 6, a virtual light source may be provided when a light-emitting element is coupled to the light incoupling surface 6. The virtual light source is composed of the light-emitting element itself coupling light into the light incoupling surface 6 and the reflection of the light incoupling surface 6 on the side face 12. With the first point 16 being located near the edge of the light incoupling surface 6, the first point 16 corresponds to a center of the aforementioned virtual light source.

The aspherical shape 14 corresponds to a conic aspherical shape with a radius R and a conic constant K and follows the equation $$y(x)=x^2/[R*(1+\mathrm{Sqrt}(1-(1+K)*x^2/R^2))],$$

with x and y being coordinates relative to a reference point of the body 4. The radius R and the conic constant K further follow the equations $$R=l^2/h+h \text{ and}$$

$$K=l^2/h^2;$$

wherein l represents a length of the conical aspherical shape 14 and wherein h represents a maximum distance of the conical aspherical shape 14 to a reference axis 20 of the body 4. The reference axis 20 intersects the first point 16 and the second point 18. With this, the aspherical shape 14 may be determined in a simple manner for a variety of dimensions l and h.

The remainder of the body 4 has a trapezoid shape with an angled planar shape of the remainder of the side face 10, resulting in an additional height $h_2$ of the body 4 and leading to a total height $h_{total}$.

Figure 2:
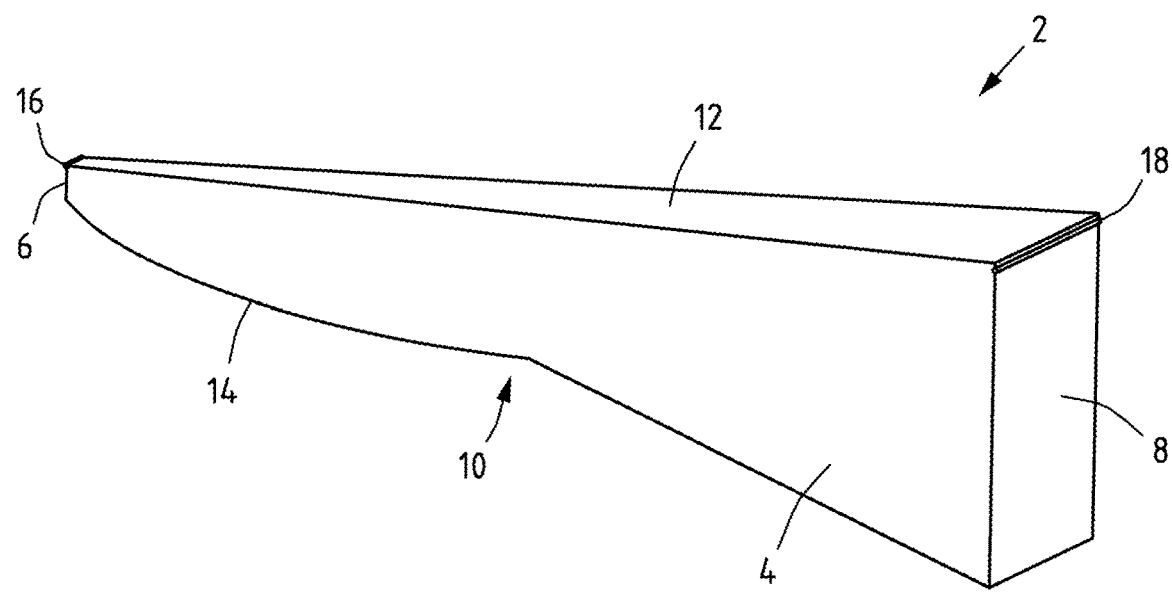
FIG. 2 shows a schematic representation of the first embodiment of an optical element for a lighting device in a three-dimensional representation.

FIG. 2 shows a schematic representation of the first embodiment of the optical element 2 in a three-dimensional representation. The aspherical shape 14 of side face 10 is capable of focussing light originating from a line of first points 16 on the light incoupling surface 6 to a line of second points 18 on the light outcoupling surface 8.

Figure 3:
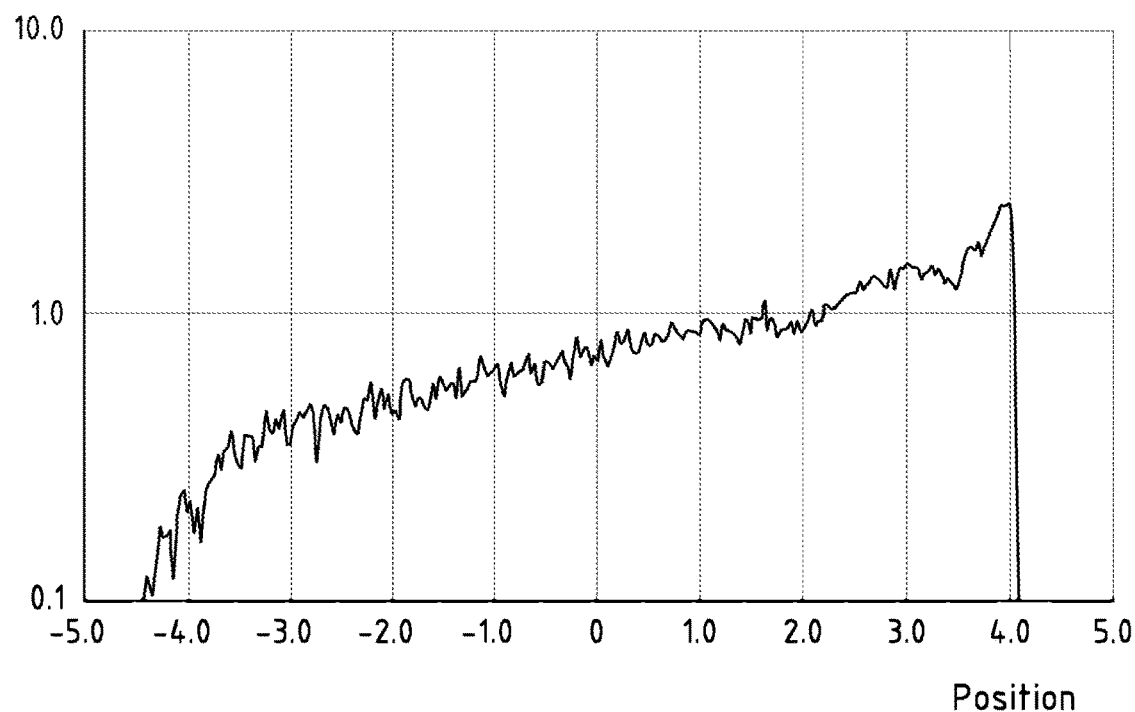
FIG. 3 shows a calculated intensity distribution along a vertical line on the light outcoupling surface for the first embodiment of the optical element.

FIG. 3 shows results of a model calculation for the intensity distribution along a vertical line on the light outcoupling surface 8 of the first embodiment of the optical element with a light-emitting element coupled to the light incoupling surface 6. The obtained intensity at the light outcoupling surface 8 is plotted in dependence of position at the light outcoupling surface 8. The optical element 2 provides an intensity distribution with an intensity peak corresponding to the second point 18 near the edge of the light outcoupling surface 8. The optical element 2 is therefore particularly useful in providing a "cut-off" in intensity for applications such as headlights and in particular low-beam headlights.

Figure 4:
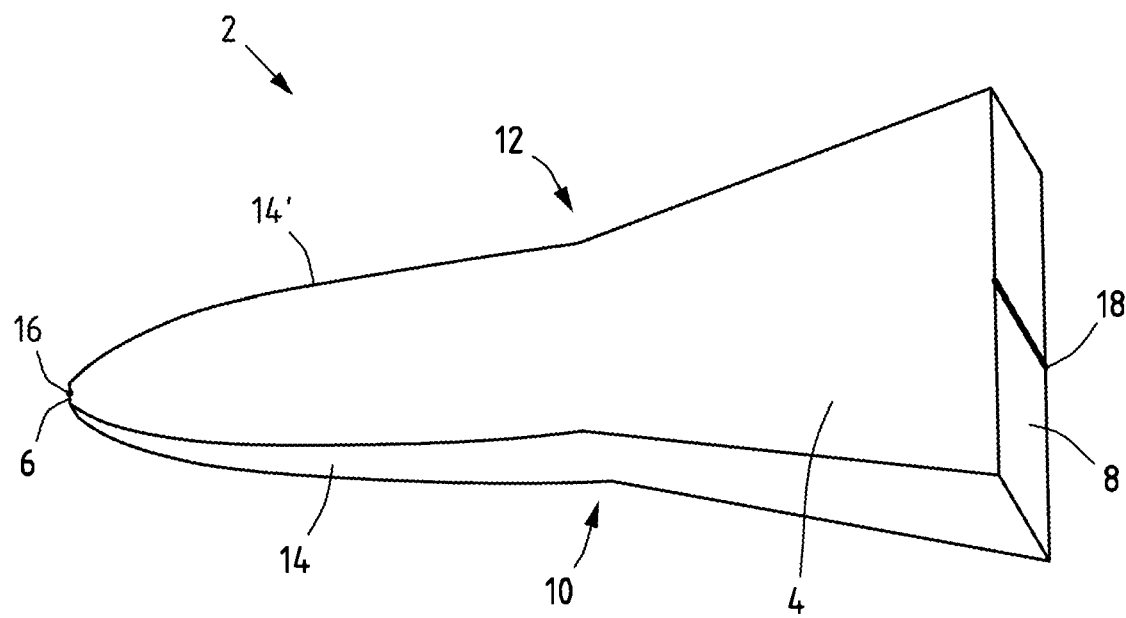
FIG. 4 shows a schematic representation of a second embodiment of an optical element for a lighting device in a three-dimensional representation.

FIG. 4 shows a schematic representation of a second embodiment of an optical element 2 for a lighting device in a three-dimensional representation. As in the first embodiment, the side face 10, in a first part touching the light incoupling surface 6, has a aspherical shape 14 focussing light originating from a first line of points 16 on the light incoupling surface 6 to a second line of points 18 on the light outcoupling surface 8 by internal reflection. The opposite side face 12 also has, in a first part near the incoupling surface 6, an aspherical shape 14'. The aspherical shapes 14, 14' are substantially symmetric to each other in respect to a reference axis in the middle of the body 4.

Figure 5:
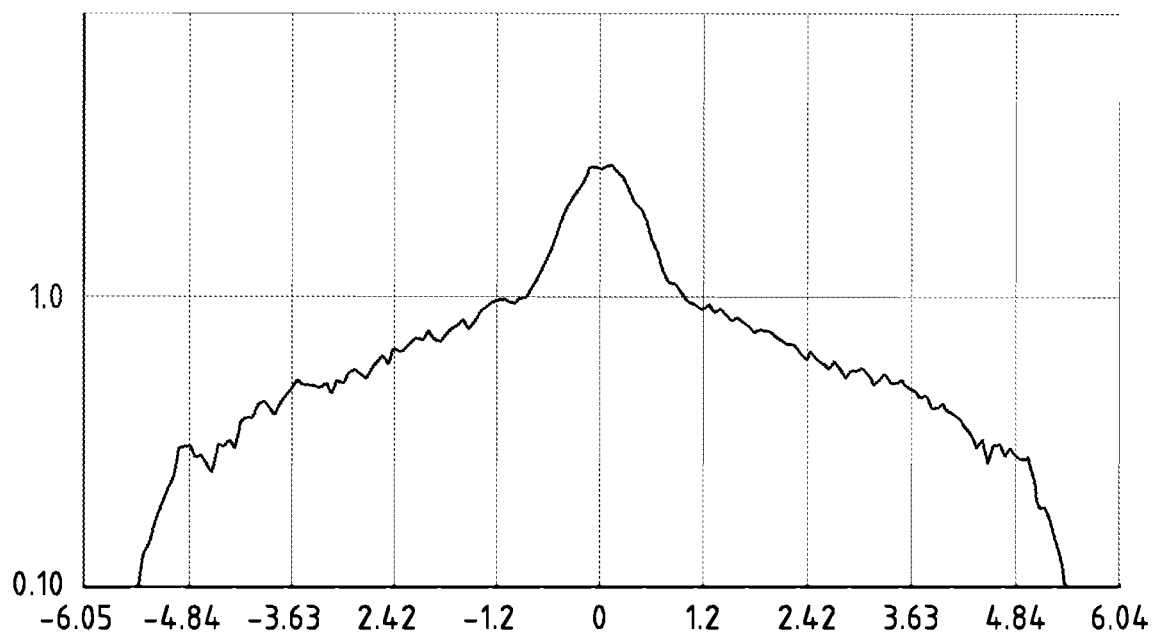
FIG. 5 shows a calculated intensity distribution along a vertical line on the light outcoupling surface for the second embodiment of the optical element.

The optical element 4 according to the second embodiment focusses light originating from a first line of points 16 located at a center line of the light incoupling surface 6 to a second line of points 18 located at a center line of the light outcoupling surface 8. Accordingly, FIG. 5 shows a calculated intensity distribution along a vertical line on the light outcoupling surface 8 for the second embodiment of the optical element 2, where an intensity peak is obtained at the center of the light outcoupling surface 8.

Figure 6:
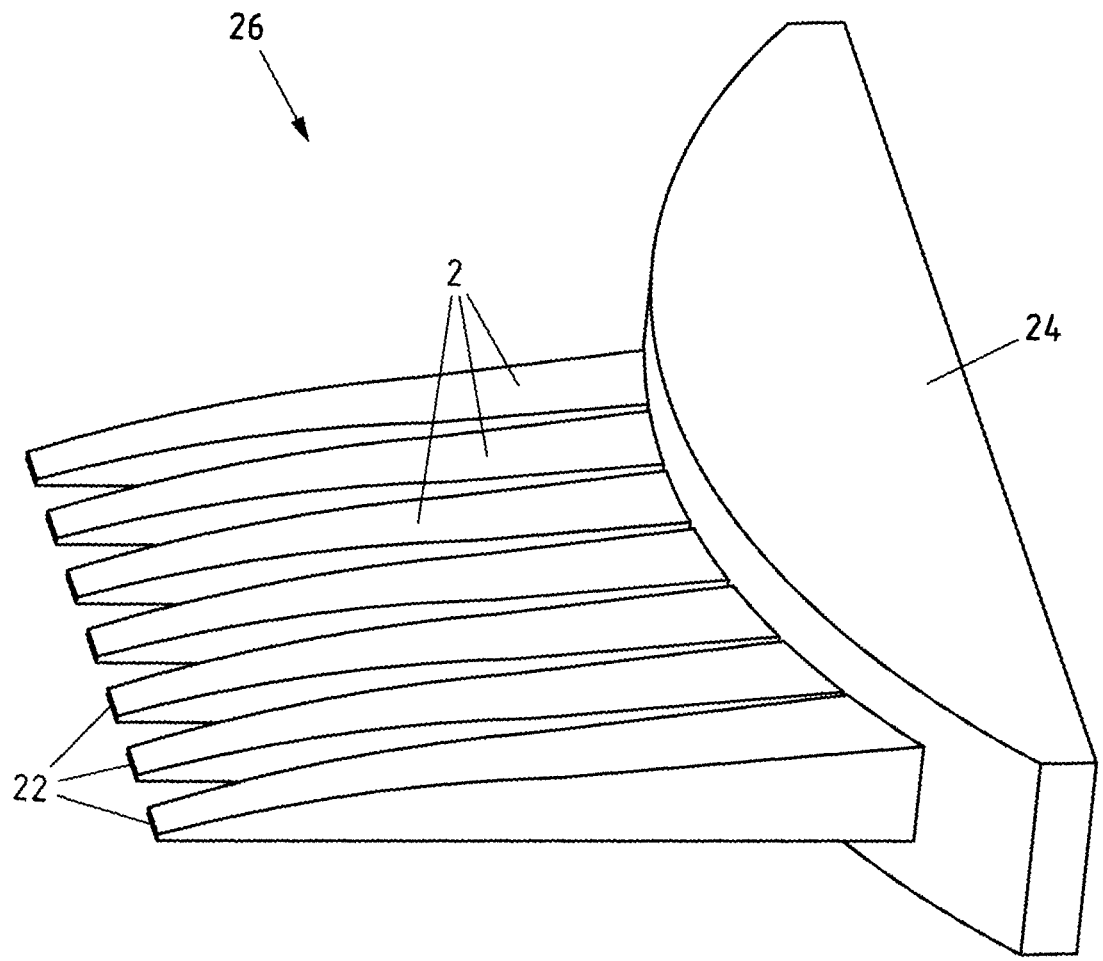
FIG. 6 shows a schematic representation of an embodiment of a lighting device in a three-dimensional representation.

FIG. 6 shows a schematic representation of an embodiment of a lighting device 26 in a three-dimensional representation. The lighting device 26 comprises several light-emitting elements 22 and optical elements 2, wherein each light-emitting element 22 is coupled to a light incoupling surface 6 of a related optical element 2. The lighting device 26 further comprises a collimator 24, where the optical elements 2 are arranged as a precollimator for the collimator 24. The lighting device 26 is configured for automotive lighting as automotive headlight. In FIG. 6, for a clearer illustration, the optical elements 2 and light-emitting elements 22 are only partly denoted by reference signs. Further optical elements 2 and light-emitting elements 22 may be provided.

The invention claimed is:

1. An optical element for a lighting device, the optical element having a body comprising:
   a material capable of conducting light;
   a light incoupling surface;
   a light outcoupling surface; and
   a first and second side faces situated opposite to each other and extending from the light incoupling surface to the light outcoupling surface;
      a first portion of the second side face proximate to the light incoupling surface having an aspherical shape, the aspherical shape configured to focus light originating from a first point on the light incoupling surface onto a second point on the light outcoupling surface by internal reflection,
   the aspherical shape defined by $y(x)=x^2/[R*(1+\mathrm{Sqrt}(1-(1+K)*x^2/R^2))]$,
   with x and y being coordinates relative to a reference point of the body, $R=l^2/h+h$, $K=l^2/h^2$, l being a length of the aspherical shape, and h being a maximum distance of the aspherical shape to a reference axis that intersects the first point and the second point.

2. The optical element according to claim 1, wherein the aspherical shape is configured to focus light originating from a line of first points on the light incoupling surface onto a line of second points on the light outcoupling surface by internal reflection.

3. The optical element according to claim 2, wherein the second point or the line of second points is located near an edge of the light outcoupling surface.

4. The optical element according to claim 2, wherein the first point or the line of first points is located near an edge of the light incoupling surface.

5. The optical element according to claim 1, wherein the first side face has a planar shape at least in sections, and
wherein the planar shape connects to the light incoupling surface.

6. The optical element according to claim 5, wherein the light incoupling surface and the planar shape are arranged to provide a virtual light source when a light-emitting element is coupled to the light incoupling surface, and
wherein the first point corresponds to a center of the virtual light source or a line of first points corresponds to a center line of the virtual light source.

7. The optical element according to claim 1, wherein the second point is located at a center of the light outcoupling surface or the line of second points is located at a center line of the light outcoupling surface.

8. The optical element according to claim 7, wherein a first portion of the first side face has an aspherical shape, and
wherein the aspherical shapes of the first and second side faces are substantially symmetric to each other with respect to the reference axis.

9. The optical element according to claim 1, wherein the aspherical shape of the second side face extends over substantially half of a distance between the light incoupling surface and the light outcoupling surface, and
wherein the aspherical shape of the second side face connects to the light incoupling surface.

10. A lighting device comprising at least one light-emitting element and at least one optical element according to claim 1, wherein the at least one light-emitting element is coupled to the light incoupling surface of the at least one optical element.

11. The lighting device according to claim 10, further comprising a collimator, wherein the at least one optical element is arranged as a precollimator for the collimator.

12. The lighting device according to claim 10, wherein the lighting device is configured for an automotive headlight.

13. A method for production of a lighting device according to claim 10, the method comprising:
   providing the at least one light-emitting element;
   providing the at least one optical element according to claim 1; and coupling the at least one light-emitting element to the light incoupling surface of the at least one optical element.

\* \* \* \* \*